United States Patent
Milan et al.

[11] Patent Number: 5,959,865
[45] Date of Patent: Sep. 28, 1999

[54] METHOD AND APPARATUS FOR CONTROLLING AN ELECTROEROSIVE MACHINE

[75] Inventors: Massimo Milan, Losone; Renzo De Maria, Bellinzona, both of Switzerland

[73] Assignee: Agie SA, Losone, Switzerland

[21] Appl. No.: 08/836,158

[22] PCT Filed: Sep. 29, 1995

[86] PCT No.: PCT/EP95/03872

§ 371 Date: Jun. 12, 1997

§ 102(e) Date: Jun. 12, 1997

[87] PCT Pub. No.: WO96/12218

PCT Pub. Date: Apr. 25, 1996

[30] Foreign Application Priority Data

Oct. 17, 1994 [DE] Germany ............................ 44 37 057

[51] Int. Cl.[6] .............................. G06F 19/00; G06G 7/64; G06G 7/66
[52] U.S. Cl. ................................ 364/474.04; 364/474.02; 364/474.06; 364/474.28
[58] Field of Search ....................... 364/191, 159, 364/138, 139, 474.04, 474.01, 474.06, 474.12, 148.09, 167.02, 167.09, 167.12, 474.02, 472.07, 474.28; 395/800, 159; 219/69.12, 69.13, 69.17, 69.18, 69.14

[56] References Cited

U.S. PATENT DOCUMENTS

| | | | |
|---|---|---|---|
| 4,586,151 | 4/1986 | Boute | 64/513 |
| 5,030,819 | 7/1991 | Borsari | 219/69.12 |
| 5,371,895 | 12/1994 | Bristol | 395/800 |
| 5,386,093 | 1/1995 | Borsari | 219/69.12 |
| 5,410,117 | 4/1995 | Reynier et al. | 219/69.12 |
| 5,532,932 | 7/1996 | Niwa | 364/474.3 |

FOREIGN PATENT DOCUMENTS

| | | |
|---|---|---|
| 41 05 291 A1 | 8/1992 | Germany . |
| WO 95/07504 | 3/1995 | WIPO . |

OTHER PUBLICATIONS

Patent Abstracts of Japan; vol. 10, No. 21 (M–449); JP A 60 180747.

Industrie–Anzeiger 18.1988, pp. 10 to 12.

International Search Report of corresponding application, PCT/EP95/03872 of Mar. 1, 1996.

Derwent Abstract for DE 41 05 291.

*Primary Examiner*—Reba I. Elmore
*Assistant Examiner*—Ramesh Patel
*Attorney, Agent, or Firm*—Darby & Darby

[57] ABSTRACT

A method and apparatus control an EDM machine with at least one input device and one computer. During and/or after input into a controller, the required control data are subdivided into object-oriented data that directly concern individual operations, and into strategic data that concern the follow-up of the operation carried out by the EDM machine. The object-oriented data and the strategic data are then processed differently.

17 Claims, 3 Drawing Sheets

METHOD AND APPARATUS FOR CONTROLLING AN ELECTROEROSIVE MACHINE

BACKGROUND OF THE INVENTION

The present invention relates to a process and to an apparatus for controlling electroerosion (EDM) machines or EDM devices, respectively.

DESCRIPTION OF THE RELATED ART

Machines of this type are used, among others, for fabricating stamps and/or molds made of conducting materials. The machines are generally operated with electronic control devices which convert control input into control signals for operating the machine. Advantageous here is the extremely high precision: the resulting forms correspond to the desired dimensions with an accuracy in the order of micrometers. Disadvantageous, however, is the enormous manufacturing complexity. An economical application of such machines is therefore frequently for fabricating, for example, mold forms, but only rarely for the series fabrication of end forms. It is therefore necessary, during normal operation of an EDM machine, before each individual workpiece is machined, to enter the control data applicable only for that respective workpiece. Aside from position and/or path coordinates of the desired cuts, the following factors have to be considered also: material, desired machining quality, for example smoothness, accuracy, required electrode(s), sequence of the process steps to be performed and so on.

Especially for EDM machines which cut stamps or molds with the help of a wire electrode, setting the order of the process steps to be performed can pose a problem. For example, a difference is made between full cuts, separation cuts and fine cuts. The term "full cut" is generally used for the cut along the largest part of the desired cutting path. Only a relatively small portion of the path is initially not machined and is only afterwards machined in a separation cut. The purpose for that is to prevent that the stamp drops uncontrolled from the workpiece which would result in damage to the workpiece and/or the machine. It is therefore customary in the automatic operation of the EDM machine to first perform all full cuts. In general, it is not necessary for an operator to be present. For the separation cuts, however, a time is preferably selected where an operator can be present and can assure a controlled withdrawal of the falling stamp.

The name "trim cut" or "fine cut" is used for an additional or repeated erosive passage along the cutting path - after full cut or separation cut - in order to achieve the desired machining quality. Since an extreme high position is always desired, various factors, especially factors leading to malfunctions, have to be considered. Among these factors may be counted, for instance, environmental factors, operating times of adjacent machines generating vibrations, flight operations at neighboring airports, rail traffic, railroad stations, highways and roads, etc., but also the operating know-how within the company, etc. Consequently, various other factors have to be considered for controlling EDM machines, aside from the desired cutting pattern.

Conventional methods for controlling EDM machines require control input in the form of closed "programs", so-called control programs. Such program includes all control inputs and determines, for example, which cut is to be performed in the workpiece to be machined, with which quality, i.e., with how many trim cuts, at which location and in which order, etc. It is here customary to provide for special process steps in the event of malfunctions, etc. The machining of the workpiece takes place after all control data required for the complete machining of the workpiece have been entered. The machining procedure is definitely set by the closed program and cannot be changed during the machining of the workpiece. Variations are only possible within the framework of special process steps which were prescribed before the machining operation was started. Corrections at a later time require that the machining process is stopped, a changed control program is set up, and a new machining procedure is started. The requirement to enter control data for the spark erosive machining as closed programs, significantly reduces the user friendliness of EDM machines.

SUMMARY OF THE INVENTION

It is therefore an object of the present invention to obviate these and other disadvantages resulting therefrom and to improve EDM machines with respect to their ease of operation and efficiency.

The invention achieves this object by providing a method for controlling an EDM machine, wherein the required control input data, during and/or after input into a controller, are subdivided, on one hand, into object-oriented input data, i.e. data relating directly to individual jobs, and, on the other hand, into strategic input data, i.e. data relating to the sequence of jobs in the machine, and wherein said object-oriented and strategic input data are processed differently.

Further, the object-related input data are combined in groups which comprise the control input data required for an individual job, in particular the position, path and/or cutting speed data (or speed of steps data), as well as at least one individualizing feature. The controller defines on the basis of the strategic input data the order in which the individual groups of object-related input data are used for controlling the EDM machine. The strategic input data relate to the individualizing features of the groups of object-related input data in such a way that the order for executing the respective jobs is defined. The strategic input data define a preferred order of jobs for a trouble-free job or one or more alternate orders of the jobs in the event of potential malfunctions. Further, the strategic input data are subdivided into functional units, wherein any one of these units taken alone is sufficient for executing the job(s) defined by the unit. The groups of object-related input data are temporarily stored in arbitrary order in an intermediate storage of the controller. The controller searches the intermediate storage at least once for groups of object-oriented input data which during the respective job are to be executed on the basis of the strategic input data, selects the desired groups based on their individualizing features, recalls these desired groups from the intermediate storage and uses these desired groups for controlling the EDM machine. The controller repeatedly searches the intermediate storage for groups of object-oriented input data which during the respective job are to be executed on the basis of the strategic input data, selects the desired groups based on their individualizing features, recalls these desired groups from the intermediate storage and uses these desired groups for controlling the EDM machine. Optionally, during the operation of the EDM machine, additional object-oriented input data are entered and/or input data relating to already existing object-related input data are changed. The strategic input data are abstracted from the concrete application, assigned to at least one individualizing feature and stored in common with said feature. The controller continuously checks before and/or during the operation of the EDM machine, if the strategic input data and/or the input data directly relating to the jobs conform to an orderly operation of the EDM machine and if these input data should be replaced by suitable preset and permanently stored input data and/or if defective input data are to be indicated by a messaging unit. Furthermore, an apparatus for controlling an electroerosion machine (EDM machine) is disclosed which includes at least one input device and a computing device which are constructed in such a way that the required control input data can be subdivided, during and/or after input into a controller, on one hand, into object-oriented input data, i.e. data relating directly to individual jobs, and, on the other hand, into strategic input data, i.e. data relating to the sequence of jobs in the machine, and wherein said object-oriented and strategic input data can be processed differently. The controller processes the object-related input data in groups comprising the control input data, in particular the position, path and/or cutting or step speed data, as well as at least one individualizing in common with said feature. The controller may further be constructed in such a way that there can be continuously checked during the operation of the EDM machine, if the strategic input data and/or the input data directly relating to the jobs conform to an orderly operation of the EDM machine and if these input data can be replaced by suitable preset and permanently stored input data and/or if defective input data can be indicated by a messaging unit.

Accordingly, the invention provides a process for controlling an EDM machine and an apparatus, in particular for executing this process, wherein the required control inputs during and/or after their input into a control device are subdivided, on one hand, into object-related inputs, meaning inputs relating to the individual processing steps, and, on the other hand, into strategic inputs, meaning inputs relating to the sequence of the processing steps in the machine, wherein these inputs are subsequently processed differently. The apparatus includes at least one input device and a computing device which is designed in such a way that the desired control inputs can, on one hand, be subdivided into object-relating inputs and, on the other hand, into strategic inputs, and subsequently processed differently accordingly. Preferably, the control apparatus of the invention includes also a memory device and/or a message device.

In this way, the conventional closed and rigid control program for determining the processing steps is eliminated. It is replaced by two groups of different control inputs with basically unlimited and diverse properties, providing novel possibilities for operating the control devices of EDM machines.

In the preferred embodiment of the invention, the object related inputs are combined in the control device into groups which contain of the control inputs required for each individual process step, especially the position, path and/or step velocity data, and at least one characteristic or individualizing feature. In this way, program building blocks are obtained which, because of their characteristic features, can be used in an arbitrary order for controlling the EDM machine.

In another advantageous embodiment, the control apparatus determines, based on the strategic input, the order in which the individual groups of object related inputs are used for controlling the EDM machine.

In another advantageous embodiment of the invention, the strategic input data in the control device make reference to the characteristic features of the groups of object related input data in such a way that the order for executing the respective process steps is determined.

Preferably, the computer device determines, based on strategic input data, a preferred order of the process steps for a trouble-free operation, or one or several alternate orders of process steps in the event that a malfunction may occur. If in the aforedescribed embodiment according to the first alternative a malfunction occurs, then the "interfered" process steps, i.e. the process steps which caused the malfunction, are initially skipped and completed at a later time. In other words, the data assigned to the individual process steps include also information relating to the status of their execution or processing, e.g. executed, still to be performed, interrupted at point X, etc. It is therefore possible to interrupt the processing of process steps (jobs) in the event of a malfunction, to switch to performing another job and to resume, in a second phase—after analysis and possibly correcting the malfunction—the execution of the first job, starting at the stored point where the interruption occurred.

In another preferred embodiment of the invention, the strategic input data are subdivided into functional units (and processed in the control device in this way), wherein each of these functional units by itself is sufficient to execute the process step(s) determined by that functional unit. This has the advantage compared to a conventional control program in that during the operation of the EDM machine, the functional units not yet processed can be changed and expanded at any time. There exists, for example, the possibility for a so-called "quick start": while it has been necessary so far to run a complex programming phase -with a normal duration in the order of half an hour to one hour— before the actual operation of an EDM machine in order to create a closed program, it is now possible to start the EDM machine immediately after entering only the first functional unit, i.e., already after a few minutes. The remaining control data can be entered afterwards. This corresponds to an increase in efficiency in the order of ten to twenty percent.

In another preferred embodiment, the groups of object related input data are temporarily stored in an intermediate memory of the control device in an arbitrary order. This has the advantage that entering the required control data can be "chaotic", i.e., can occur in an arbitrary order. The operator may, for example, follow any individual method without having to take into consideration which order would be correct for technical reasons.

Preferably, the control device searches the intermediate memory at least once for the groups of objects related input data which have to be executed in the respected process interval as a result of the strategic input data, selects the desired groups based on their characteristic features, recalls the groups from the intermediate memory, and uses the groups for controlling the EDM machine. In another advantageous embodiment of the process according to the invention, this step is performed repeatedly. In this way, changes occurring over a very short time can also be taken into consideration.

In another preferred embodiment, the control device is constructed in such a way that optionally during the operation of the EDM machine additional object related input data can be entered and/or already existing object related input data can be changed.

In another advantageous embodiment of the invention, the strategic input data are treated separately from the actual application, are assigned to at least one characteristic feature, and stored together with that feature. This has the advantage that for example, operational know-how relating to advantageous sequences of cuts can be recalled at any time once they have been entered. In this way, the programming expenses and complexity associated with the operation of the machine are significantly reduced.

In another advantageous embodiment of the invention, the control device checks continuously before and/or during the operation of the EDM machine if the strategic input data and/or the input data relating directly to the process steps are compatible with an orderly operation of the machine. If necessary, the input data are replaced by suitable input data which are preset and permanently stored, and/or erroneous input data are announced via a message device. Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

In FIG. 1, several control input data have already been entered. The strategic input data relating to the order of process steps in the machine are grouped into functional units 1–11. They are arranged in a working memory 12 linearly, i.e. sequentially, and are processed in the order indicated by arrow 13. In the process step shown, there is a functional unit 1 in the execution phase. The unit makes reference to groups of object related input data associated with that unit, wherein the input data directly fix certain process steps, e.g. full cuts, trim cuts and/or separation cuts which are indicated hereinafter by the characteristic feature "gamma". This is indicated by the symbol arrow/gamma and the connecting arrows 15, 17, and 19 between the functional unit 1 and the groups of object related input data 21, 23, and 25 in the Figure. The order and the content of the functional units 1–11 may have been recalled from a memory 27, either in its entirety or in part, or may have been entered anew via an input device 29, either in its entirety or in part.

Figure 1:
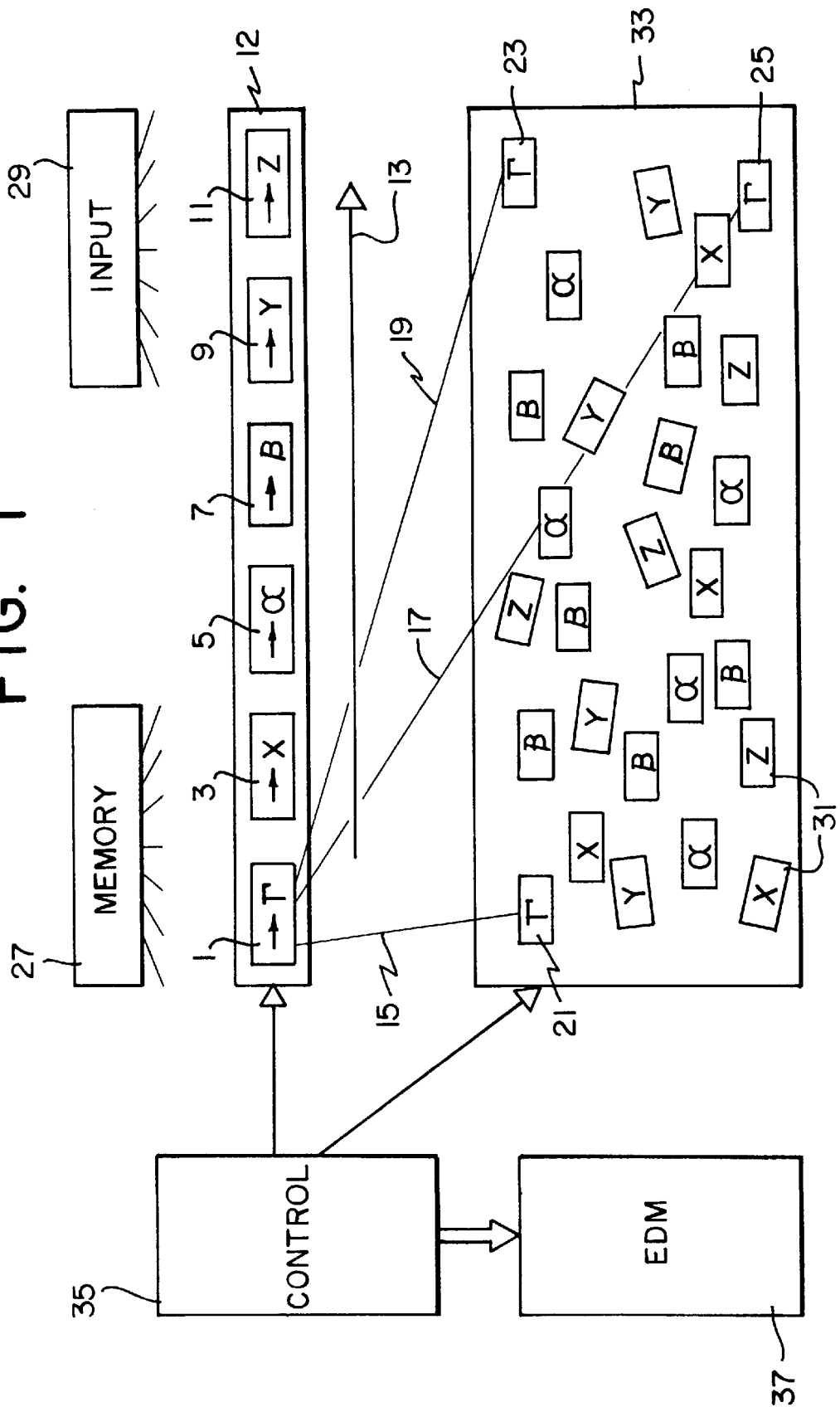
FIG. 1 a schematic representation of a control structure corresponding to a process of the invention without actual changes in the control inputs.

The groups of object oriented input data 21, 23, 25, and 31 are characterized by the attributes alpha, beta, gamma, x, y, and z and include each the control input required for a single process step, especially the position path and/or step velocity data. They are stored in an intermediate memory 33 in arbitrary order and can be recalled from a memory 27 in the same way as the functional units, or may have been entered a new via an input device 29. Here, the memories 27 and 33 may be independent memory devices of arbitrary design or may be sections in a single memory. In the depicted process stage, a control device 35 converts the object related input data 21, 23, 25 into control signals for operating the EDM machine 37. The control device 35 did previously search the intermediate memory 33 for object related groups characterized by the feature gamma. These groups are processed in the order in which they were found. Subsequently, the functional unit 1 is removed from the working memory 12 and stored otherwise or is removed- as having been processed from the further process, while the functional unit 3 is subsequently processed in the same way. The other functional units 5–11 follow.

After their (first) processing, the object related groups 21, 23, 25, and 31 are not removed from the intermediate memory 33. It is then possible, for example for trim cuts—which follow the full cuts and separation cuts—to return to the path coordinates described by the above object related groups. It would also be possible to remove the object related groups 23, 25, and 31 from the intermediate memory 33 if they are no longer needed. Possible also is an automatic determination of the full and separation cut region when the cutting path is preset.

Figure 2:
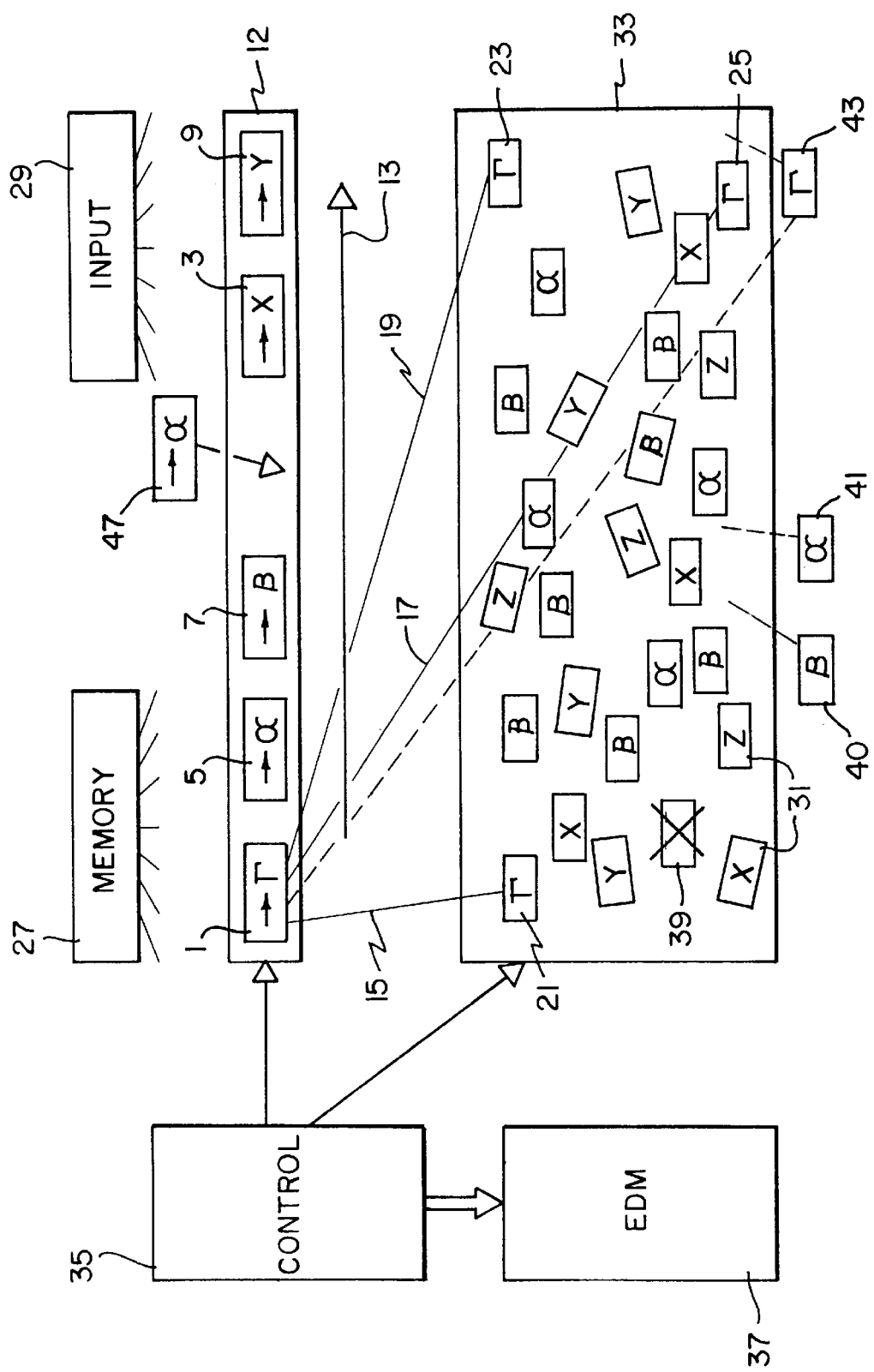
FIG. 2 a schematic representation of a control structure corresponding to a process of the invention with actual changes in the control inputs.

In FIG. 2, there is shown the same process stage as in FIG. 1. Processed at this point in time is the functional unit 1 which relates to object related groups characterized by "gamma". Simultaneously, various changes were and are made during the process execution. For example, the order of the functional units 3–9 was interchanged, and the unit 11 was omitted. This may have occurred automatically, for example, on the basis of errors that occurred; it may also have occurred as a result of changes entered manually by the operator who, for example, wanted to take into account new information about external interferences, error sources, etc. A decisive advantage is here the basically unlimited freedom of design and consequently flexibility of the process of the invention resulting therefrom. Also at this point in time, other object related groups 40, 41, and 43 as well as the functional unit 47 are entered and the object related group 39 is deleted. This has no impact on the ongoing operation of the EDM machine 37.

If the process of the invention is designed in such a way that the intermediate memory 33 is searched for object related groups characterized, for example, by gamma, also during the time when the functional unit 1 is processed, then the newly entered data of a fourth group 43 of this type can still be taken into consideration (indicated by arrow 45).

Figure 3:
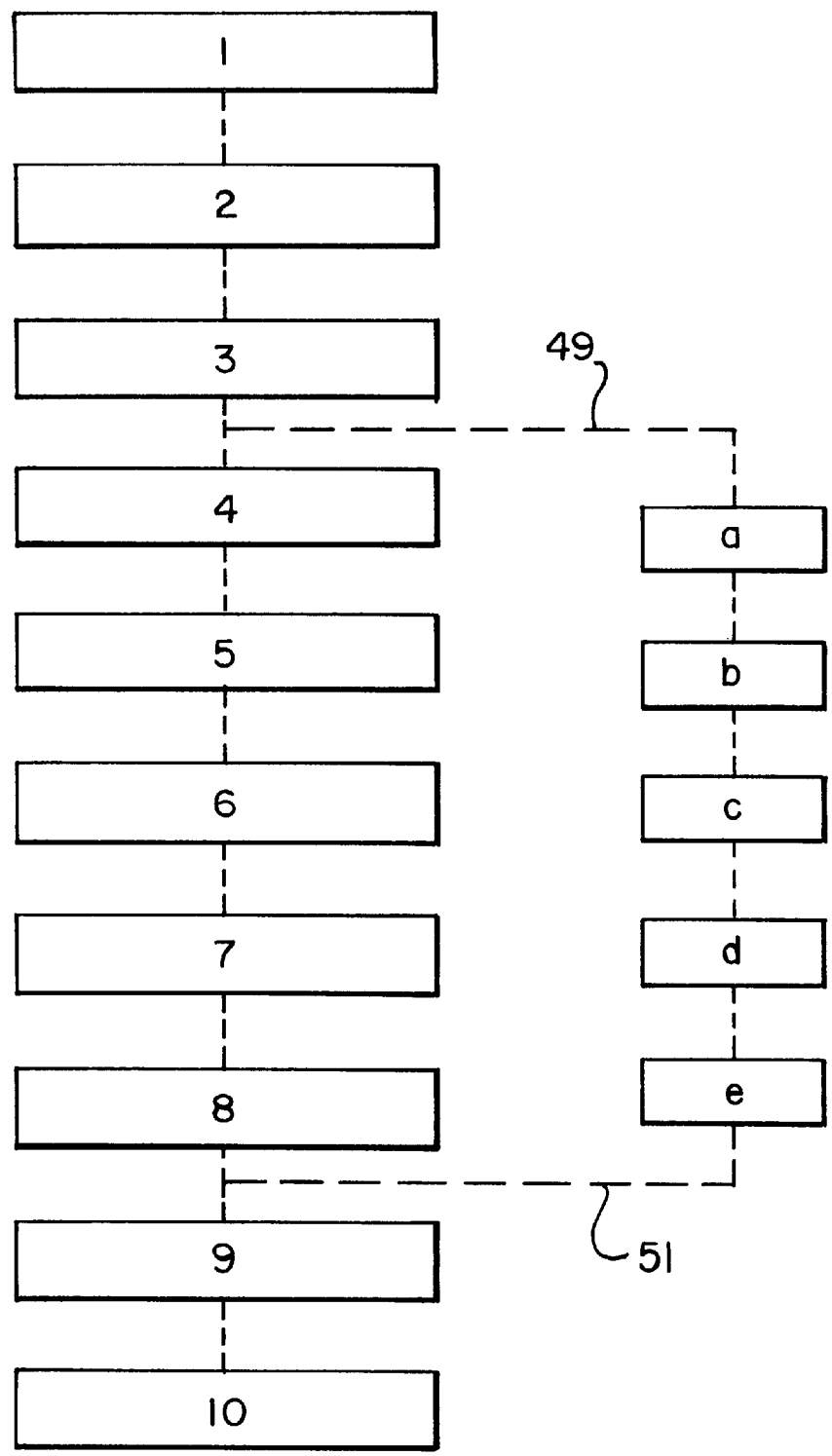
FIG. 3 a schematic representation of a conventional control structure.

Finally, in FIG. 3, there is sketched as a comparison a conventional control program representing the present state of the art. The object related and the strategic input data are entered in an interconnected fashion and are processed linearly. Exceptions are only preprogrammed branch points 49 and 51 which, however, are processed at preset fixed program sections. A corrective intervention during the process execution is not possible.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For feature. The controller is constructed in such a way that based on the strategic input data, the order can be defined in which the individual groups of object-related input data are used for controlling the EDM machine.

Further, the controller, based on the strategic input data, relates to the individualizing features of the groups of object-related input data in such a way that the order for executing the respective jobs is defined. The controller is constructed in such a way that based on the strategic input data, there can be defined a preferred order of the jobs for a trouble-free job or one or more alternate orders of the jobs in the event of potential malfunctions. The controller processes the strategic input data into functional units, wherein any one of these units taken alone is sufficient for executing the job(s) defined by the unit. The controller is constructed in such a way that the groups of object-related input data can be temporarily stored in arbitrary order in an intermediate storage of the controller. The controller is constructed in such a way that the intermediate storage is repeatedly searched for groups of object-oriented input data which during the respective job are to be executed on the basis of the strategic input data, that the desired groups are selected based on their individualizing features, recalled from the intermediate storage and used for controlling the EDM machine. The controller is constructed in such a way that optionally, during the operation of the EDM machine, additional object-oriented input data can be entered and/or input data relating to already existing object-related input data can be changed. Further, the controller is constructed such that the strategic input data are abstracted from the concrete application, assigned to at least one individualizing feature and can be stored example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for controlling an electroerosion machine to perform a plurality of jobs, comprising the steps of:
   a. combining object-oriented input data relating directly to individual jobs into groups, each group including control input data required for an individual job, wherein the control input data includes at least one of position data, path data, and cutting speed data;
   b. characterizing each group with a predetermined type of working process including the step of:
      b1. adding characterizing features;
   c. storing each group of object-oriented input data together with the corresponding characterizing features in an intermediate storage;
   d. referring to the characterizing features of the groups of object-oriented input data within strategic input data relating to a sequence of jobs in the machine;
   e. searching the intermediate storage using a controller for groups of object-oriented input data together with the corresponding characterizing features required by the corresponding strategic input data;
   f. processing groups of object-oriented input data searched in step (e); and
   g. defining the sequence of jobs by the controller using the plurality of strategic input data; and
   h. executing the sequence of jobs by repeating steps (d)–(g).

2. The method according to claim 1, wherein the strategic input data define one of a preferred sequence of jobs for a trouble-free operation and at least one alternate orders of the jobs in the event of potential malfunctions.

3. The method according to claim 2, wherein the strategic input data are subdivided into functional units and wherein any one of these units taken alone is sufficient for executing the job defined by the unit.

4. The method according to claim 3, wherein the groups of object-related input data are temporarily stored in arbitrary order in an intermediate storage of the controller.

5. The method according to claim 4, wherein the controller searches the intermediate storage at least once for groups of object-oriented input data which during the respective job are to be executed on the basis of the strategic input data, selects the desired groups based on their characterizing features, recalls these desired groups from the intermediate storage and uses these desired groups for controlling the electroerosion machine.

6. The method according to claim 4, wherein the controller repeatedly searches the intermediate storage for groups of object-oriented input data which during the respective job are to be executed on the basis of the strategic input data, selects the desired groups based on their characterizing features, recalls these desired groups from the intermediate storage and uses these desired groups for controlling the electroerosion machine.

7. The method according to claim 6, wherein optionally, during the operation of the electroerosion machine, additional object-oriented input data are entered and input data relating to already existing object-related input data are changed.

8. The method according to claim 7, wherein the strategic input data are abstracted from the concrete application, assigned to at least one characterizing feature and stored in common with said feature.

9. The method according to claim 8, wherein the controller continuously checks before and during the operation of the electroerosion machine, if the strategic input data and the input data directly relating to the jobs conform to an orderly operation of the electroerosion machine and if these input data should be replaced by suitably preset and permanently stored input data and if defective input data are to be indicated by a massaging unit.

10. An apparatus for controlling an electroerosion machine to perform a plurality of jobs, comprising:
    at least one input device; and
    at least one computing device including:
       means for combining object-oriented input data relating directly to individual jobs, into groups wherein each group including control input data required for an individual job, wherein the control input data includes at least one of position data, path data, and cutting speed data;
       means for marking the association of these groups with predetermined types of working processes having characterizing features;
       means for storing each group of object-oriented input data together with the corresponding characterizing features in an intermediate storage;
       means for referring to the characterizing features of the groups of object-oriented input data within strategic input data relating to a sequence of jobs in the machine;
       a controller for searching the intermediate storage for groups of object-oriented input data together with the corresponding characterizing features required by the corresponding strategic input data;
       wherein the controller processes groups of object-oriented input data searched by the controller; and
       wherein the controller defines the sequence of jobs using a plurality of strategic input data for the sequence of jobs to be repeatedly executed using the referring means and the controller.

11. The apparatus according to claim 10, wherein the controller is constructed such that, based on the strategic input data, there can be defined a preferred job sequence for a trouble-free operation or one or more alternate job sequences in the event of potential malfunctions.

12. The apparatus according to claim 10, wherein the controller processes the strategic input data into functional units, and wherein any one of said units taken alone is sufficient for executing the job defined by the unit.

13. The apparatus according to claim 12, wherein the controller is constructed such that the groups of object-related input data can be temporarily stored in arbitrary order in an intermediate storage of the controller.

14. The apparatus according to claim 13, wherein the controller is constructed such that the intermediate storage is repeatedly searched for groups of object-oriented input data which during the respective job are to be executed on the basis of the strategic input data, that the desired groups are selected based on their characterizing features, recalled from the intermediate storage and used for controlling the electroerosion machine.

15. The apparatus according to claim 14, wherein the controller is constructed in such a way that optionally, during the operation of the electroerosion machine, additional object-oriented input data can be entered and input data relating to already existing object-related input data can be changed.

16. The apparatus according to claim 15, wherein the controller is constructed such that the strategic input data are abstracted from the concrete application, assigned to at least one characterizing feature and stored together with said feature.

17. The apparatus according to claim 16, wherein the controller is constructed such that there can be continuously checked before and during the operation of the electroerosion machine, if the strategic input data and the input data directly relating to the jobs comply with an orderly operation of the electroerosion machine and if these input data can be replaced, if necessary, by suitably preset and permanently stored input data and/or defective input data can be transmitted by a massaging unit.

* * * * *